United States Patent
Granat et al.

(10) Patent No.: US 9,455,619 B1
(45) Date of Patent: Sep. 27, 2016

(54) SYSTEM AND METHOD FOR IMPLEMENTING CURRENT SHARING BETWEEN PACKAGED POWER SUPPLIES

(71) Applicant: Lockheed Martin Corporation, Bethesda, MD (US)

(72) Inventors: Stanley M. Granat, Baldwinsville, NY (US); Randall A. Gabriel, Utica, NY (US); Jorge-Luis B. Romeu, Syracuse, NY (US); Dominick Rizzo, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 186 days.

(21) Appl. No.: 14/090,094

(22) Filed: Nov. 26, 2013

(51) Int. Cl.
*G06F 1/00* (2006.01)
*G05F 1/565* (2006.01)
*H02M 1/088* (2006.01)

(52) U.S. Cl.
CPC .................................. *H02M 1/088* (2013.01)

(58) Field of Classification Search
CPC .......... G05F 1/10; G05F 1/461; G05F 1/462; G05F 1/56; G05F 1/565
USPC .......................... 323/241, 246, 266, 268–288
See application file for complete search history.

(56) References Cited

U.S. PATENT DOCUMENTS

| | | | |
|---|---|---|---|
| 4,717,833 A | 1/1988 | Small | |
| 5,477,132 A | 12/1995 | Canter et al. | |
| 6,141,231 A * | 10/2000 | Brkovic | H02J 1/102 363/72 |
| 6,515,460 B1 * | 2/2003 | Farrenkopf | H02M 3/1584 323/272 |
| 6,574,124 B2 | 6/2003 | Lin et al. | |
| 7,479,772 B2 * | 1/2009 | Zane | H02J 1/102 323/272 |
| 8,392,730 B2 | 3/2013 | He | |
| 2003/0141907 A1 | 7/2003 | Canova et al. | |
| 2010/0164477 A1 * | 7/2010 | Trivedi | G06F 1/26 324/107 |
| 2011/0133704 A1 * | 6/2011 | Zambetti | H02M 3/1584 323/212 |
| 2011/0291623 A1 * | 12/2011 | Granat | H02M 3/156 323/271 |
| 2012/0049813 A1 * | 3/2012 | Huang | H02M 3/1584 323/272 |
| 2012/0223692 A1 * | 9/2012 | Prodic | H02M 3/1584 323/283 |
| 2012/0293155 A1 * | 11/2012 | Chan | H02J 1/102 323/317 |
| 2012/0299560 A1 * | 11/2012 | Gu | H02M 3/1584 323/212 |
| 2013/0057239 A1 * | 3/2013 | Kalje | H02M 3/1584 323/271 |
| 2013/0057240 A1 * | 3/2013 | Zambetti | H02M 3/1584 323/271 |
| 2013/0169249 A1 * | 7/2013 | Lee | H02M 3/1584 323/272 |
| 2013/0293203 A1 * | 11/2013 | Chen | H02M 1/084 323/234 |

OTHER PUBLICATIONS

Jordan, M., Load Share IC Simplifies Parallel Power Supply Design, Texas Instruments Application Note SLUA146, 1999.

(Continued)

*Primary Examiner* — Adolf Berhane
*Assistant Examiner* — Gary Nash
(74) *Attorney, Agent, or Firm* — Howard IP Law Group, P.C.

(57) ABSTRACT

A system for implementing current sharing between packaged power converter modules is provided. The system includes a respective current monitoring circuit for generating a current signal indicative of the current supplied by each power converter module, and a respective inverter for inverting the current signals. The current signals and the inverted current signals from each module are provided to a differential current share bus. For each module, an error amplifier is provided to supply a remote sense terminal of the module with a control signal indicative of the difference between the current share bus reference level and a respective current signal.

18 Claims, 3 Drawing Sheets

(56) References Cited

OTHER PUBLICATIONS

Balogh, L., The UC3902 Load Share Controller and Its Performance in Distributed Power Systems, Texas Instruments Application Note, SLUA 128, May 1997.

Irving B. Jovanovic, M., Analysis, Design, and Performance Evaluation of Droop Current-Sharing Method, Delta Products Corporation, presented at IEEE APEC 2000 Proceedings, Feb. 2000, pp. 235-241.

Panov, Y., Jovanovic, M., Stability and Dynamic Performance of Current-Sharing Control for Paralleled Voltage Regulator Modules, Delta Power Corporation, presented at IEEE APEC 2001 proceedings, Mar. 2001, pp. 765-771.

Luo, et al., A Classification and Evaluation of Paralleling Methods for Power Supply Modules, presented at IEEE PESC 1999 proceedings, 1999, pp. 901-908.

Mammano, R., Load Sharing for Distributed Power, Intel Technology Symposium, Sep. 2000.

\* cited by examiner

US 9,455,619 B1

SYSTEM AND METHOD FOR IMPLEMENTING CURRENT SHARING BETWEEN PACKAGED POWER SUPPLIES

FIELD OF THE INVENTION

The present disclosure relates generally to systems and methods for balancing the outputs of at least two power supplies arranged in parallel, and more specifically, to systems and methods for implementing current sharing between prepackaged power supplies.

BACKGROUND

In many applications a plurality of commercial off-the-shelf (COTS) or modifiable off-the-shelf (MOTS) packaged power supply modules or "bricks" may be connected in parallel to support systems requiring supplied load currents that are larger than the capabilities of each individual module. The output voltage of each packaged module is typically controlled by internal control circuitry, which may include an error amplifier. In the event of an increase in the load current demand, the output voltage of the supply decreases. This internal error amplifier senses the voltage decrease through its external remote voltage sense terminals or pins, and drives the module output voltage higher, restoring a desired output voltage level at the new output load current. As typical COTS and MOTS modules have their control circuitry isolated by potted materials, these remote sense terminals are the only means available to change the feedback of the internal control loops of the modules.

When arranged in parallel configurations, the modules often do not provide equal output current (i.e. where each of N modules provides the load current/N). This may be the result of, for example, the tolerances of the internal voltage references and resistor dividers within each module causing each module to settle to a slightly different output voltage during use. Moreover, when these modules have their outputs connected in parallel, the modules with the highest output voltage will attempt to supply the load current. The other modules, with lower level output voltages, will sense that the output voltage already exceeds their set point levels so they do not have to supply anything. The result may be that only a small number of modules provide all of the load current while a remaining portion of the modules supply little or no current. As certain applications require that each module supply an equal share of the load current, some feedback method must be implemented to achieve improved output balance during operation.

Accordingly, improved systems and methods are desired for providing even current sharing between parallel COTS power supplies for balancing the outputs thereof.

SUMMARY

In one embodiment of the present disclosure a system for implementing current sharing between packaged power converter modules is provided. The system includes a respective current monitoring circuit for generating a current signal indicative of the current supplied by each module, and a respective inverter for inverting each of the current signals. The current signal and the inverted current signal from each module are provided to a differential current share bus. For each module, an error amplifier is provided to supply a remote sense terminal of the module with a control signal indicative of the difference between the current share bus reference level and a respective current signal.

In another embodiment of the present disclosure a method for implementing current sharing between a plurality of packaged power converter modules arranged in parallel and connected to a common load is provided. The method includes generating a current signal indicative of the current supplied by each module, and supplying the current signal to a first portion of a differential current share bus common to each module. The current signal of each module is also inverted, and supplied to a second portion of the differential current share bus. A remote sense terminal of each module is supplied with a control signal from the differential current share bus for adjusting the output current of each module to match an average level of the differential current share bus.

DETAILED DESCRIPTION OF PREFERRED EMBODIMENTS

Figure 1:
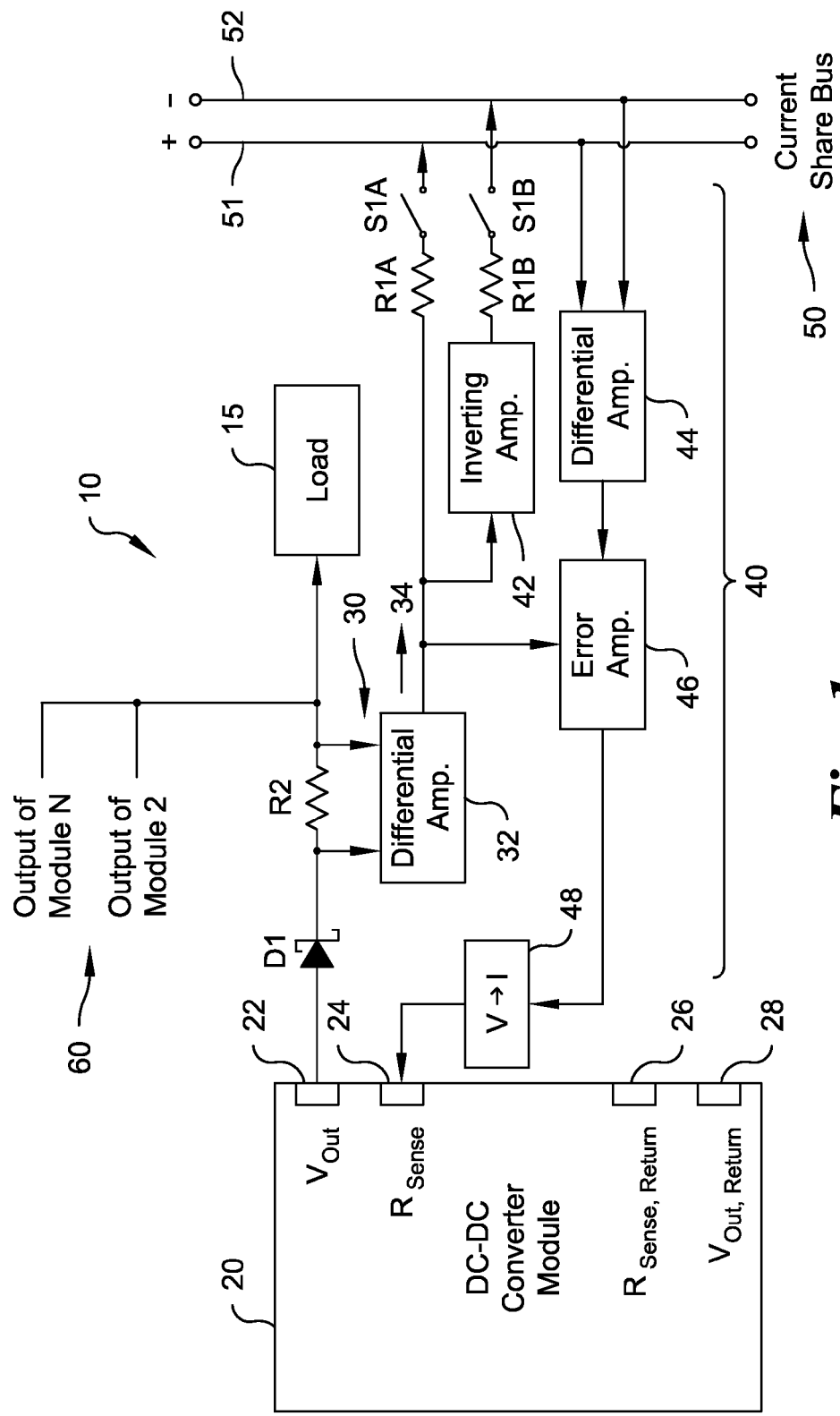
FIG. 1 is a schematic diagram of an exemplary current sharing circuit for controlling packaged power supplies according to an embodiment of the present disclosure.

It is to be understood that the figures and descriptions of the present invention have been simplified to illustrate elements that are relevant for a clear understanding of the present invention, while eliminating, for purposes of clarity, many other elements found in power supplies, such as pre-potted, COTS power supplies. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure provide a means to implement average current sharing among parallel packaged power supplies offering limited access to internal control circuitry. Previous average current sharing systems and methods implemented between similar supplies have provided a single-ended resistor connection between a current monitor of each supply and a common current share bus. This arrangement, however, results in reference level distortion due to common mode noise created by, for example, the physically disparate locations of the modules and the high currents flowing to the load.

Embodiments of the present disclosure utilize only the externally-accessible remote voltage sense feedback terminals of each power supply module to slightly vary the individual module output voltages, such that each module provides a current equal to the total load current divided by the number of modules. More specifically, one way to influence the output voltage of a module is to inject or remove a signal current at the remote voltage sense terminal of the module. Given the terminal voltage is at the level of the module output, injecting current into the terminal forces the internal control loop of the converter module to lower the output voltage. Conversely, removing current from this terminal forces the internally-monitored voltage feedback signal to a lower level. The internal control loop responds by increasing the output voltage. Embodiments described herein include control circuitry for providing these correction signals.

In one embodiment of the present disclosure, a control method is implemented via a self-configuring differential current share bus connected between modules, current monitoring circuits for monitoring the current supplied by each module, and individual error amplifiers that adjust the input to the modules' remote voltage sense connections to balance the output currents from each module. The output of each current monitoring circuit is supplied to the current share bus through a common-value resistor. The output of each current monitoring circuit may also be inverted, such that both a non-inverted and an inverted current signal are supplied to the current share bus. The current share bus reference may be buffered to the internal control circuitry of each module by a respective differential high common mode rejecting error amplifier.

By setting the value of the resistors between each of the current monitoring circuits and the current share bus equal, the current share bus level will be equal to the average of the total output current divided by the number of power modules. In this way, embodiments of the present disclosure adjust each module output via the remote sense terminals until its output current is equal to the reference current level derived from the current share bus. Moreover, with the same value resistor connecting all of the module output signals of the same polarity, common mode noise present within the power distribution system is prevented from interfering with the average differential current reference level. This arrangement also makes the current share bus independent of ground return voltage drops between circuits.

Referring generally to FIG. 1, an exemplary power supply and control system 10, including a current sharing circuit according to an embodiment of the present disclosure, is illustrated. As set forth above, embodiments of the present disclosure are operative to provide average current sharing between packaged power supply modules, wherein access to the control circuitry of the module is limited to its remote sense terminals. For example, DC-to-DC converter module 20 comprises an internal controller or control circuitry, access to which is restricted to remote sense terminal 24 and its corresponding return terminal 26. The output of converter module 20 is operative to supply a load 15 through a first blocking diode $D_1$ (e.g. a Schottky diode) and a current sense resistor $R_2$ via output terminal 22 of converter 20. As illustrated, additional converter modules 60 (modules 2-N) may also be provided (e.g. wired in parallel) for supplying load 15. In the illustrated embodiment, a current sharing circuit 40 is shown for controlling the output of module 20.

Current sharing circuit 40 comprises a current monitoring circuit 30, including current sense resistor $R_2$, and a first differential amplifier 32 operatively connected at a first input to the output of converter module 20, and at a second input to the total output of each of converter modules 1-N. Current monitoring circuit 30 is configured to produce an output 34 (i.e. a current signal) indicative of the difference between the output of converter module 20, and the average of the total output of converter modules 1-N supplying load 15. This difference is supplied to a differential current share bus 50 through a pair of resistors $R_{1A}, R_{1B}$. More specifically, output 34 is provided to a non-inverted portion 51 of current share bus 50 via resistor $R_{1A}$. Current sharing circuit 40 further includes an inverter, or inverting amplifier 43, for inverting output 34, and supplying this inverted signal to an inverted portion 52 of differential current bus 50 through resistor $R_{1B}$.

A second differential amplifier 44 is connected at a first input to non-inverted portion 51 of differential current share bus 50, and at a second input, to inverted portion 52 of differential current share bus 50. Differential amplifier 44 is configured to produce a second output signal indicative of the difference between these non-inverted and inverted portions of differential current share bus 50. This output signal is coupled to a first input of an error amplifier 46, with a second input thereof operatively connected to output 34 of current monitoring circuit 30. Error amplifier 46 is configured to output a third signal indicative of the difference between the outputs of differential amplifier 32 (i.e. the difference between the output of converter 20, and the average of the sum total output of each of converters 1-N), and differential amplifier 44 (i.e. the difference between the non-inverted and inverted portions of the current share bus). The output of error amplifier 46 may be provided to a voltage-to-current converter 48 for supplying a current signal to remote sense terminal 24 of converter module 20. Voltage-to-current converter 48 may comprise, for example, an integrated transconductance amplifier or a voltage to current converter configured from a transistor emitter follower. This may require the addition of a bias supply that provides voltage above the COTS module output voltage to support the current sourcing or sinking implementation. In this way, the output of error amplifier 46 is operative to adjust the individual output current level of converter module 20 to an average reference level of current share bus 50 The error signals injection or removal of current is preferred so that the adjustment is independent of the initial output voltage set point of the COTS module.

Still referring to FIG. 1, embodiments of the present disclosure may implement analog switches $S_{1A}, S_{1B}$ for selectively connecting current share bus 50 to the output of resistors $R_{1A}, R_{1B}$. In one exemplary configuration, switches $S_{1A}, S_{1B}$ may be maintained in their conductive state by a status signal output from a respective module 20. In the event of a detected loss or malfunction of a module, the status signal may be terminated, or otherwise altered, and switches $S_{1A}, S_{1B}$ opened, disconnecting resistors $R_{1A}, R_{1B}$ from current share bus 50.

The result of this action would be to raise the average level of the current reference on current share bus 50, allowing the remaining paralleled modules 2-N to proportionately increase their output current magnitudes and maintain the total load current level. By way of example only, nine modules supplying 90 amperes (A) total would supply 10 A each. If a supply module malfunctions and cannot supply its share (i.e. 10 A), the current share bus level would self-adjust to 11.25 A/module (90 A divided by eight modules), thus supporting the load. This mechanism implements redundancy to the power supply system without the problems of implementing, for example, a master/slave topology.

Figure 2:
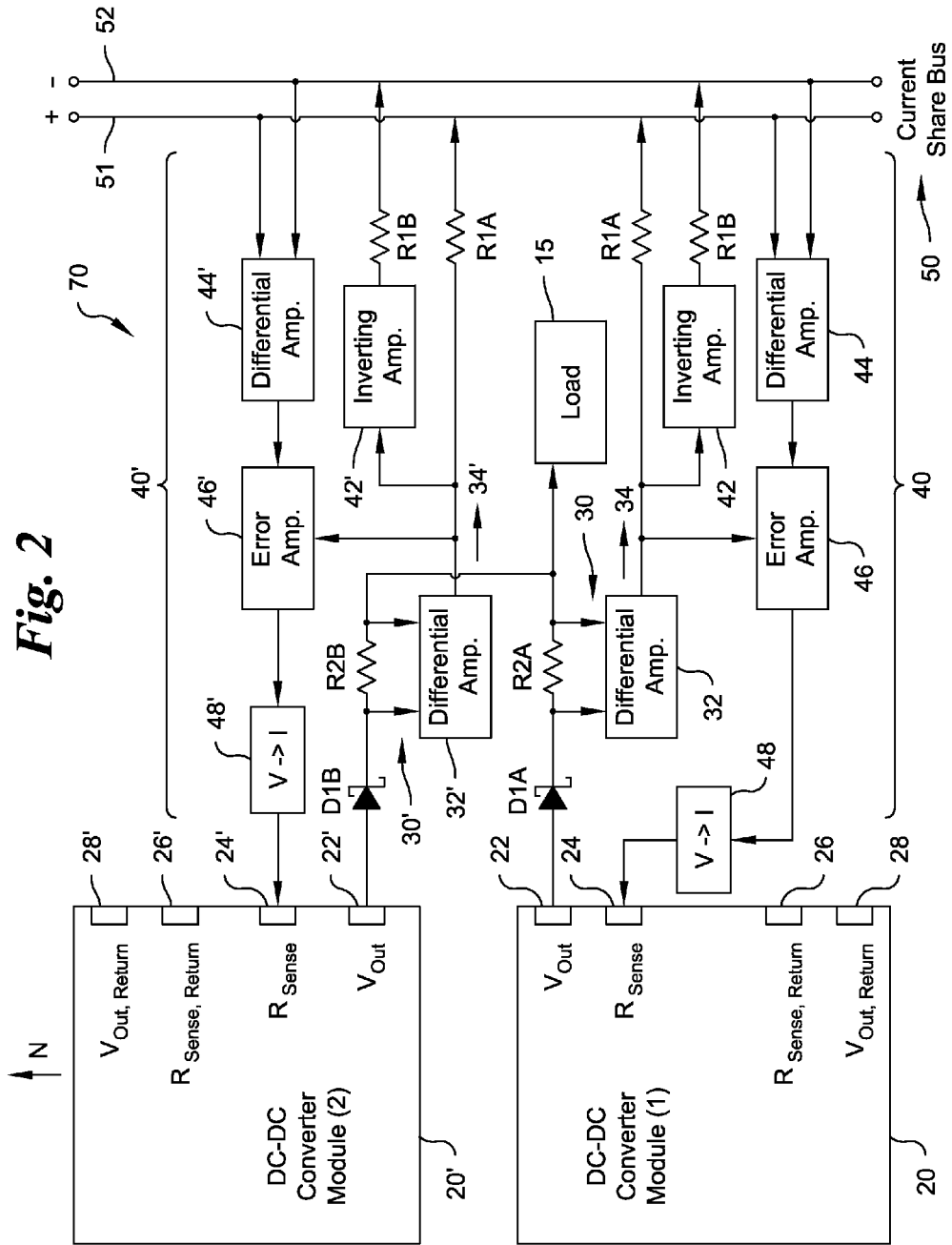
FIG. 2 is a schematic diagram of the current sharing circuit of FIG. 1, illustrating two packaged power supplies operatively connected thereto.

Referring generally to FIG. 2, an exemplary power supply and control system 70 is shown, illustrating power converting module 20 of FIG. 1 arranged in parallel with a second power converting module 20'. As illustrated, each module 20,20' is operatively associated with a respective current sharing circuit 40,40' and connected to a common differential current share bus 50. As set forth above with respect to FIG. 1, current sharing circuits 40,40' are configured to provide current sharing between converter modules 20,20', wherein access to the control circuitry of the modules is limited to remote sense terminals 24,24'. Current sharing circuits 40,40' are shown operatively connected to respective converter modules 20,20'. Specifically, converter modules 20,20' are operatively connected to a load 15 through respective first blocking diodes $D_{1A},D_{1B}$ and resistors $R_{2A}$, $R_{2B}$ via output terminals 22,22' thereof. Current monitoring circuits 30,31' include current sense resistors $R_{2A},R_{2B}$, and first differential amplifiers 32,32'. First differential amplifiers 32,32' are operatively connected at first inputs to the output of each respective converter module 20,20', and at second inputs to the total output of both converter modules 20,20'. In this way, differential amplifiers 32,32' are each configured to output the difference between the output of a respective converter module 20,20', and the total output converter modules 20,20' supplying load 15. This difference is supplied through respective equal-value resistors $R_{1A}$ to a non-inverted portion 51 of differential current share bus 50. Current sharing circuits 40,40' further include respective inverting amplifiers 42,42' for inverting the output of differential amplifiers 32,32' and supplying an inverted output through equal-value resistors $R_{1B}$ to an inverted portion 52 of differential current bus 50.

Second differential amplifiers 44,44' are connected at first inputs to non-inverted portion 51 of the differential current share bus 50, and at second inputs to inverted portion 52 of differential current share bus 50. Differential amplifiers 44,44' are configured to output the difference between the non-inverted and inverted portions 51,52 of current share bus 50. The outputs of differential amplifiers 44,44' are coupled to first inputs of error amplifiers 46,46'. Second inputs of error amplifiers 46,46' are operatively connected to the outputs of first differential amplifiers 32,32'. In this way, error amplifiers 46,46' are configured to output the difference between the output of a respective differential amplifier 32,32' (i.e. the difference between the output of each converter 20,20' and the average of the sum total output of each of converters 1-N), and the output of a respective differential amplifier 44,44' (i.e. the difference between non-inverted 51 and inverted portions 52 of current share bus 50). The outputs of error amplifiers 46,46' are provided to respective voltage-to-current converters 48,48' (e.g. a transistor emitter follower or an integrated transconductance amplifier) for supplying current control signals to remote sense terminals 24,24' of converter modules 20,20'. It should be understood that a switching arrangement, such as that described above with respect to FIG. 1, may be implemented into each of current sharing circuits 40,40'.

Figure 3:
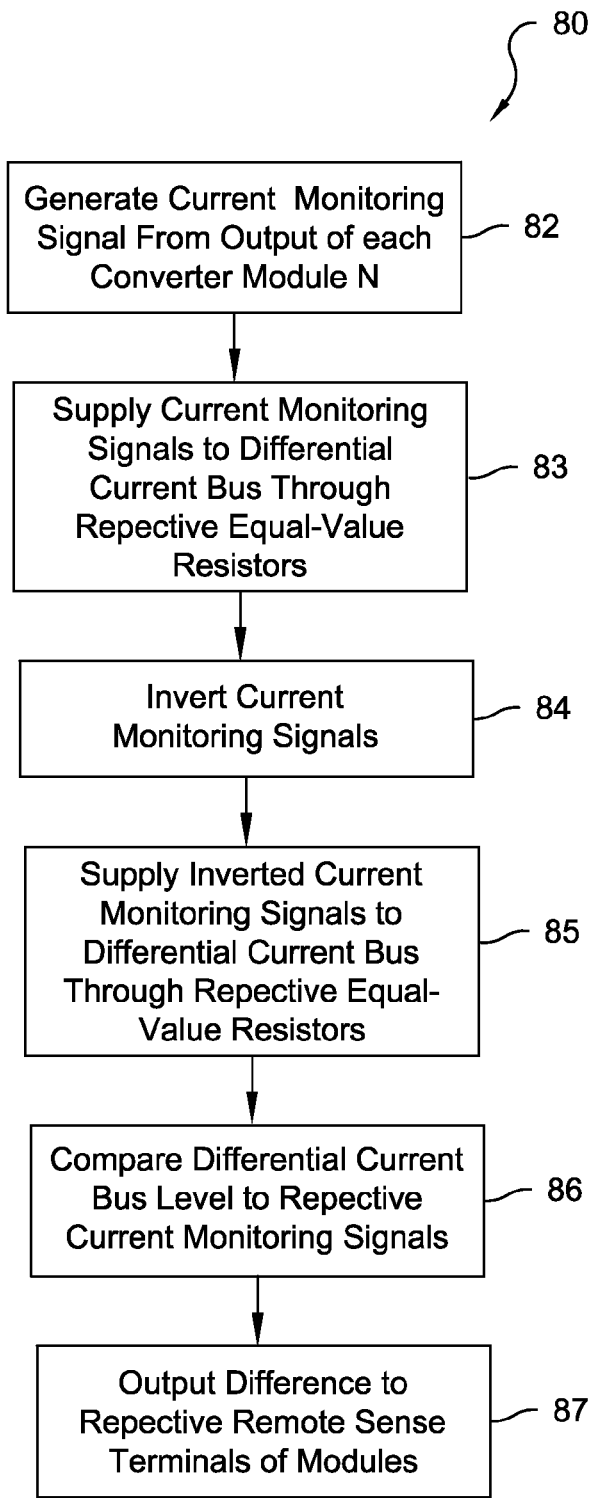
FIG. 3 is a process diagram of an exemplary method of implementing current sharing between packaged power supplies according to an embodiment of the present disclosure.

Referring generally to FIG. 3, an exemplary method 80 for introducing current sharing between a plurality of converter modules having limited access to internal control circuitry as set forth above with respect to FIGS. 1 and 2 is provided. In a first step 82, for each converter module, a current signal representing the current magnitude supplied by the module is generated. These signals are provided to a non-inverted portion of a differential current share bus through single-valued resistors (step 83). The current signal from each module is also inverted in step 84, and supplied to a second portion of the differential current share bus through second single-valued resistors in step 85. In step 86, the differential current share bus reference level is compared to the current signal for each module, and the difference output to the internal control circuitry of each module via a remote sense terminal in step 87.

Embodiments of the present disclosure provide many advantages over the solutions of the prior art. For example, the bandwidth of the external error amplifier (e.g. error amplifier 46) utilized by embodiments of the present disclosure is configured to have a higher unity gain frequency than the converter module's internal control error amplifier. This minimizes phase shift imparted on feedback signals, as the internal voltage control error amplifier of the module typically has a relatively lower unity gain frequency. Moreover, bandwidth and loop stability of the individual modules remain the same, as if the module was used in a single stand-alone configuration.

The embodiments described herein also permit the reuse of converter module designs, by providing a method of combining these existing supply modules to meet the varying power supply requirements over multiple programs. "N+1" redundancy is also provided by the circuit, which is transparent to the end user. Further still, converter modules can be tested incrementally. For example, testing can begin with a single module, followed by enabling a second and then a third, etc. without outside interaction. The reference average current structure self-adjusts as modules are connected and disconnected, maintaining current share balance.

Finally, the differential average current share bus minimizes the impact of system level common mode voltage arising from high current flow between modules and connectors, from biasing voltage offsets at the current error amplifiers feeding back to each module. This improves the current share accuracy, permitting the relocation of power modules to meet packaging requirements. The end result is an ability to equalize the current supplied by each of several modules to within 0.33% of average current (i.e. +/-100 mA/module at 30 A/module).

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method to implement current sharing between a plurality of packaged power converter modules arranged in parallel and connected to a common load, the method comprising:
for each module, generating a current signal indicative of the current supplied by the module;
supplying the current signals from the plurality of modules to a common first conductor of a differential current share bus;
inverting the current signal from each module;
supplying the inverted current signals from the plurality of modules to a common second conductor of the differential current share bus;
supplying a signal from the differential current share bus to an internal controller of each module to adjust the output current of each module.

2. The method of claim 1, wherein current signal represents the difference between an output of a respective module and a total average output current of the plurality of modules.

3. The method of claim 2, wherein the step of supplying a signal from the differential current share bus to an internal controller of each module includes generating a first signal representing the difference between the first and second conductors of the differential current share bus.

4. The method of claim 1, further including the step of providing a respective first resistance between the current signal from each module and the first conductor of the differential current share bus.

5. The method of claim 4, further including the step of providing a respective second resistance between the inverted current signal from each module and the second conductor of the differential current share bus.

6. The method of claim 5, wherein the first and second resistances are equal.

7. A method of implementing current sharing between a plurality of packaged power converter modules arranged in parallel and connected to a common load, the method comprising:
for each module, generating a current signal indicative of the current supplied by the module;
supplying the current signals from each module to a first portion of a differential current share bus;
inverting the current signals from each module;
supplying the inverted current signals from each module to a second portion of the differential current share bus;
generating a first signal representing the difference between the first and second portions of the differential current share bus;
generating a plurality of control signals, each control signal representing the difference between the current signal of a respective module and the first signal; and
outputting the control signals to a respective internal controller of each module to adjust the output current of the module.

8. The method of claim 7, wherein each control signal is output to a remote sense terminal of the module.

9. A system for implementing current sharing between a plurality of packaged power converter modules comprising:
for each power converter module:
a current monitoring circuit for generating a current signal indicative of the current supplied by the power converter module; and
an inverter for inverting the current signal; and
a differential current share bus common to each power converter module and having a non-inverted conductor for receiving the current signals from the current monitoring circuit of each power converter module and an inverted conductor for receiving the inverted current signals from the current monitoring circuit of each power converter module,
wherein the differential current share bus is configured to be connected to an internal controller of each power converter module for adjusting the output current of the power converter module to an average level of the differential current share bus.

10. The system of claim 9, wherein the current monitoring circuit includes a first differential amplifier for generating the current signal, and wherein the current signal is indicative of the difference in current between the output of the power converter module, and an average total output of the plurality of power converter modules.

11. The system of claim 9, further comprising a first resistor arranged between the output of the current monitoring circuit and the non-inverted conductor of the differential current share bus.

12. The system of claim 9, further comprising a first switch arranged between the output of the current monitoring circuit and the non-inverted conductor of the differential current share bus, and a second switch arranged between the inverter and the inverted conductor of the differential current share bus.

13. A system for implementing current sharing between a plurality of packaged power converter modules comprising:
a current monitoring circuit including a first differential amplifier for generating a current signal indicative of the current supplied by a power converter module;
an inverter operatively connected to the output of the first differential amplifier for inverting the current signal; and
a differential current share bus having a non-inverted portion for receiving the current signal and an inverted portion for receiving the inverted current signal,
wherein the differential current share bus is configured to be connected to an internal controller of the power converter module for adjusting the output current of the power converter module to an average level of the differential current share bus.

14. The system of claim 13, further comprising a second differential amplifier configured to generate a first signal indicative of the difference between the inverted and non-inverted portions of the differential current share bus.

15. The system of claim 14, further comprising an error amplifier for generating a control signal representing the difference in current between the current signal and the first signal.

16. The system of claim 15, wherein the error amplifier is configured to output the control signal to a remote sense terminal of the power converter module.

17. A system for implementing current sharing between a plurality of packaged power converter modules comprising:
a current monitoring circuit for generating a current signal indicative of the current supplied by a power converter module;

an inverter for inverting the current signal;
a differential current share bus having a non-inverted portion for receiving the current signal and an inverted portion for receiving the inverted current signal;
a first resistor arranged between the output of the current monitoring circuit and the first portion of the differential current share bus; and
a second resistor arranged between the inverter and the second portion of the differential current share bus,
wherein the differential current share bus is configured to be connected to an internal controller of the power converter module for adjusting the output current of the power converter module to an average level of the differential current share bus.

18. The system of claim 17, wherein the resistances of the first and second resistors are equal.

* * * * *

UNITED STATES PATENT AND TRADEMARK OFFICE
CERTIFICATE OF CORRECTION

PATENT NO.        : 9,455,619 B1
APPLICATION NO.   : 14/090094
DATED             : September 27, 2016
INVENTOR(S)       : Stanley M. Granat et al.

Page 1 of 1

It is certified that error appears in the above-identified patent and that said Letters Patent is hereby corrected as shown below:

On the Title Page

Item (72) in the Inventors section of the patent, add the inventor name -- Andrew J. Cleary -- immediately after "Dominic Rizzo".

Signed and Sealed this
Thirtieth Day of May, 2017

Michelle K. Lee
*Director of the United States Patent and Trademark Office*